US012092296B1

(12) United States Patent
Zhang

(10) Patent No.: US 12,092,296 B1
(45) Date of Patent: Sep. 17, 2024

(54) FIREWORK LIGHTING DEVICE

(71) Applicant: GEMMY INDUSTRIES CORPORATION, Coppell, TX (US)

(72) Inventor: Cheng-Chun Zhang, Shenzhen (CN)

(73) Assignee: GEMMY INDUSTRIES CORPORATION, Coppell, TX (US)

( * ) Notice: Subject to any disclaimer, the term of this patent is extended or adjusted under 35 U.S.C. 154(b) by 0 days.

(21) Appl. No.: 18/432,783

(22) Filed: Feb. 5, 2024

(51) Int. Cl.
*F21V 15/01* (2006.01)
*F21V 23/00* (2015.01)
*F21W 121/00* (2006.01)

(52) U.S. Cl.
CPC ............ *F21V 15/01* (2013.01); *F21V 23/003* (2013.01); *F21W 2121/00* (2013.01)

(58) Field of Classification Search
CPC ............................... F21V 15/01; F21V 23/003
See application file for complete search history.

(56) References Cited

U.S. PATENT DOCUMENTS 6,709,145 B1 * 3/2004 Huang .................... F21S 10/06 362/249.17
7,380,956 B2 * 6/2008 Richmond ........... G03B 21/145 362/121
D904,665 S * 12/2020 Martin ........................... D26/81
D1,024,397 S * 4/2024 Xie ................................ D26/69
12,018,821 B1 * 6/2024 Chen ..................... F21V 31/005
2003/0016544 A1 * 1/2003 Huang .................... F21V 21/10 362/249.16
2003/0156411 A1 * 8/2003 Ahroni ...................... F21S 2/00 362/249.01
2004/0190309 A1 * 9/2004 Bixler ....................... F21S 4/20 362/565
2005/0231975 A1 * 10/2005 Bixler .................... A47G 33/08 362/565
2022/0065429 A1 * 3/2022 Xie ........................... F21S 4/20
2023/0250940 A1 * 8/2023 Huarong ............... F21V 17/002 362/433

* cited by examiner

*Primary Examiner* — Bryon T Gyllstrom
(74) *Attorney, Agent, or Firm* — MUNCY GEISSLER OLDS & LOWE P.C.

(57) ABSTRACT

A firework lighting device comprises a spherical body, multiple conical elements detachably mounted to the spherical body and a light module mounted inside the spherical body. The spherical body is hollow and formed by assembling two shells and two terminal caps. The light module has multiple light strips respectively extending into the multiple conical elements and emitting light in multiple colors. The spherical body and the conical elements form a shape with a sphere at middle and multiple cones radiating outwardly from the sphere, which looks like fireworks. When turned on, the light strips of the light module light the conical elements up, so the firework lighting device produces a lighting effect resembling fireworks, thereby increasing decoration effects. Also, because the two shells and the two terminal caps of the spherical body are detachable, manufacturing convenience of the spherical body is increased.

18 Claims, 10 Drawing Sheets

FIREWORK LIGHTING DEVICE

BACKGROUND OF THE INVENTION

1. Field of the Invention

The present invention relates to a firework lighting device, especially to a decorating lighting device displaying lighting effects resembling fireworks.

2. Description of Related Art

A lighting device comprises a lampshade, which allows light to pass through, and a light-emitting element mounted inside the lampshade. The light-emitting element generates light such that the lighting device can glow. Other than lighting up the environment, people often use lighting devices with different figures and colors to create different ambiances. That is, a lighting device also can be used for decoration purposes.

To give different decoration effects, manufacturers alter the lampshade's color of the lighting device or print figures on the lampshade, so when the light passes through the lampshade, the lighting device can show different colors and figures, giving different decoration effects. However, just altering colors or printing figures is still insufficient in decoration effects. Therefore, the conventional lighting device has room for improvement.

SUMMARY OF THE INVENTION

The technical issue that the present invention to resolve is that just altering colors or printing figures on a conventional lighting device's lampshade is insufficient in decoration effect.

The solution that the present invention provides is a firework lighting device comprising a spherical body, multiple conical elements and a light module.

The spherical body is hollow and comprises two shells and two terminal caps. The two shells are detachably assembled to each other. The two terminal caps respectively correspond to the two shells. Each one of the two terminal caps is assembled to the corresponding shell. Each corresponding pair of the shell and the terminal cap form multiple installing tubes, which are spaced apart from each other. Each one of the multiple installing tubes is hollow and has two installing protrusions. Each one of the two terminal caps has at least one extending tube having two extending protrusions. The multiple conical elements are hollow and allow light to pass through. Each one of the multiple conical elements has an installing portion, disposed at an end of said conical element and having two installing recesses. Each one of the multiple conical elements corresponds to and is assembled to one of the multiple installing tubes or the at least one extending tube through the installing portion, and communicates to an interior of the spherical body through the corresponding installing tube or the corresponding extending tube. The two installing protrusions of each one of the multiple installing tubes respectively engage with the two installing recesses of the installing portion of the corresponding conical element. The two extending protrusions of the at least one extending tube respectively engage with the two installing recesses of the installing portion of the corresponding conical element. The light module is mounted to the interior of the spherical body and has multiple light strips, which respectively extend into the multiple conical elements and emit light in multiple colors.

The firework lighting device has an appearance that looks like fireworks due to the spherical body and the multiple conical elements, which form a shape that has a sphere at the middle with multiple cones radiating outwardly from the sphere. Also, the multiple light strips of the light module extend into the multiple conical elements and can emit light in various colors. When the firework lighting device is turned on, the multiple light strips of the light module light up the multiple conical elements, so the firework lighting device generates a lighting effect resembling fireworks, thereby increasing decoration capabilities of the firework lighting device.

Besides, the spherical body is formed by assembling the two shells and the two terminal caps, and the multiple conical elements are assembled to the multiple installing tubes or the at least one extending tube. Therefore, components of the firework lighting device can be produced respectively, hence increasing manufacturing convenience of the firework lighting device. Additionally, since the two shells and the two terminal caps are detachable, replacing or installing the light module, which is inside the spherical body, becomes easier, thereby increasing usage convenience of the firework lighting device.

BRIEF DESCRIPTION OF THE DRAWINGS

FIG. 9 is an operational view of FIG. 1, showing the firework lighting device turned on.

DETAILED DESCRIPTION OF THE PREFERRED EMBODIMENT

Figure 1:
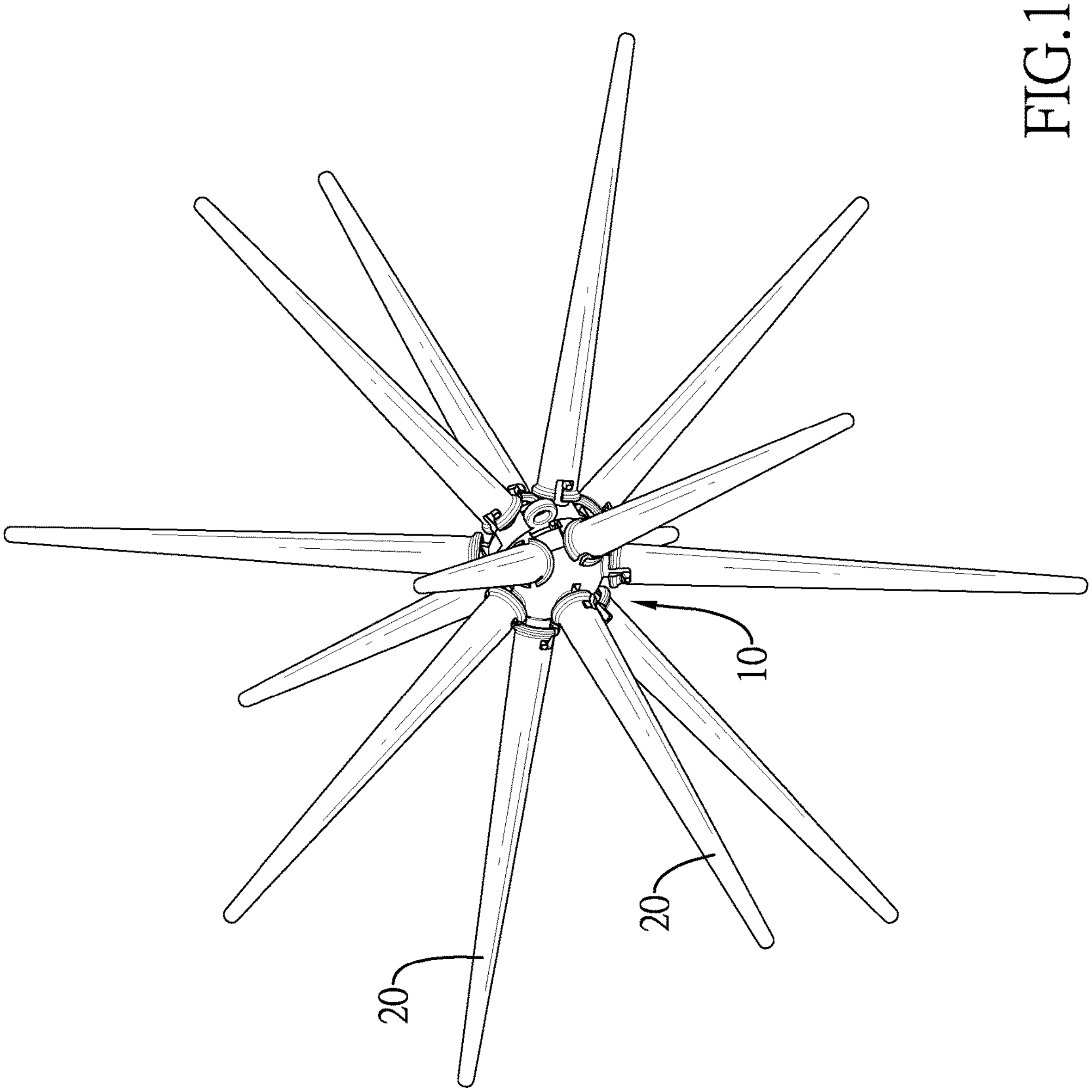
FIG. 1 is a perspective view of an embodiment of a firework lighting device.
Figure 2:
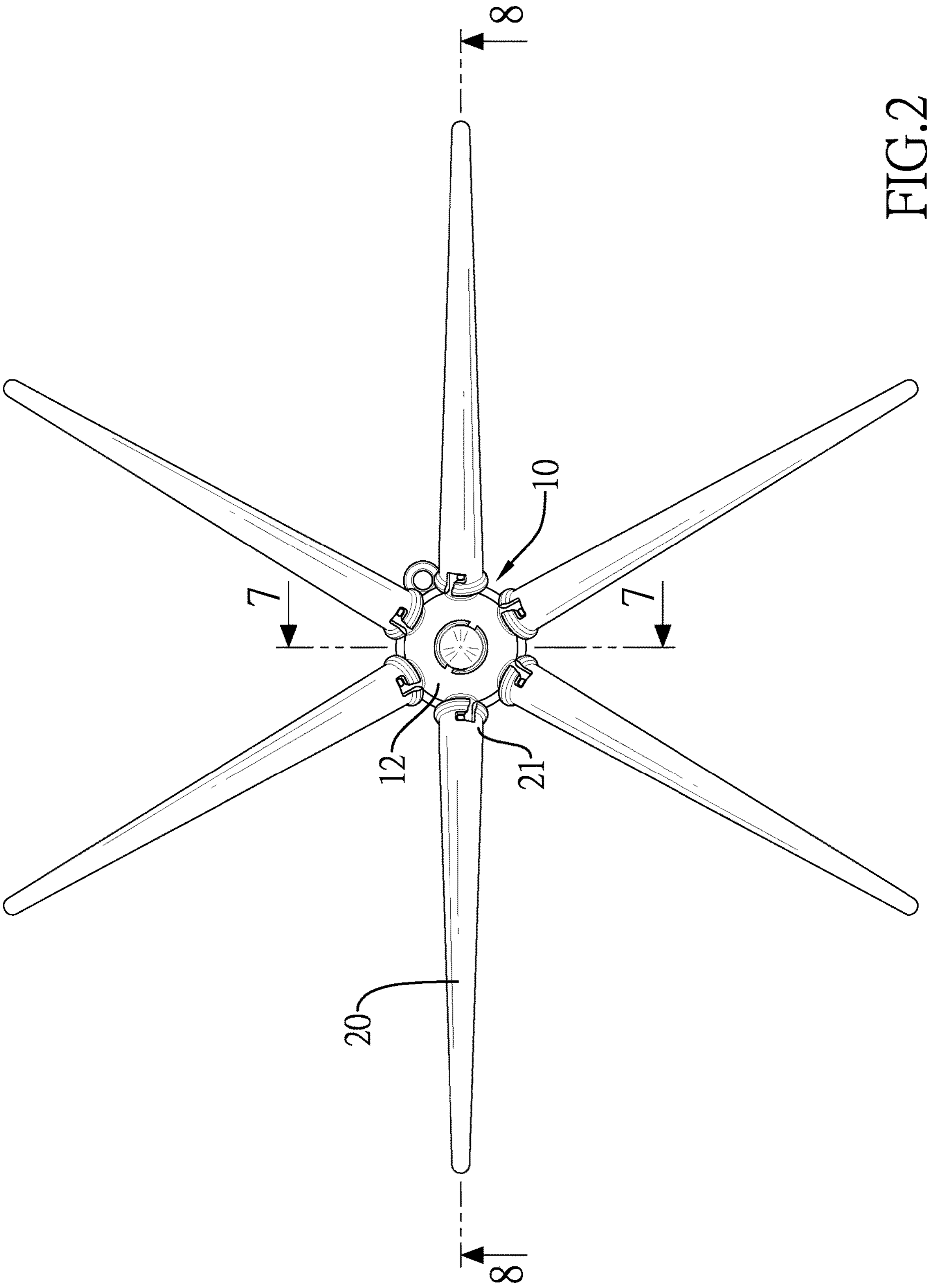
FIG. 2 is a front view of the firework lighting device in FIG. 1.
Figure 3:
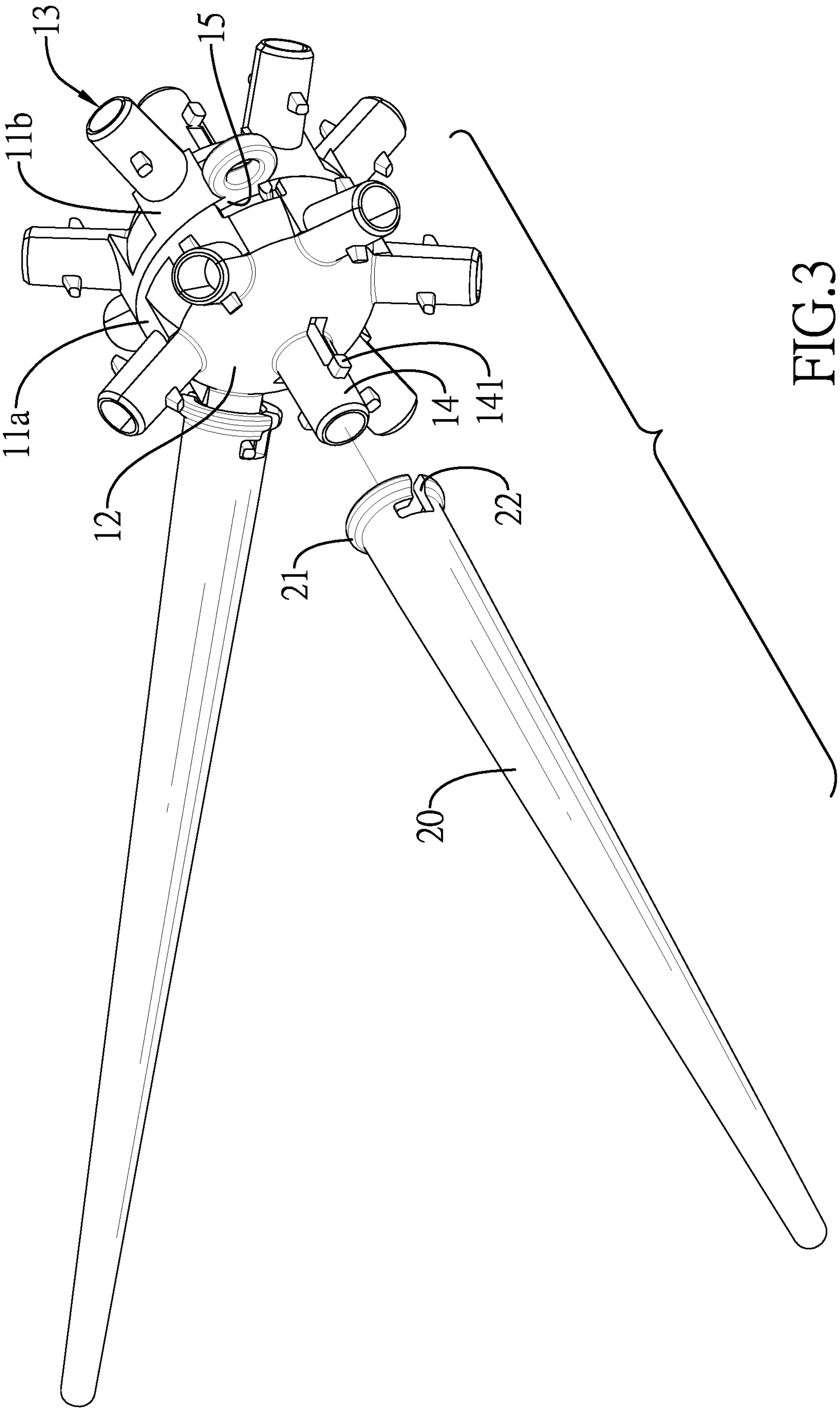
FIG. 3 is an exploded view of a spherical body and a conical element of the firework lighting device in FIG. 1.
Figure 4:
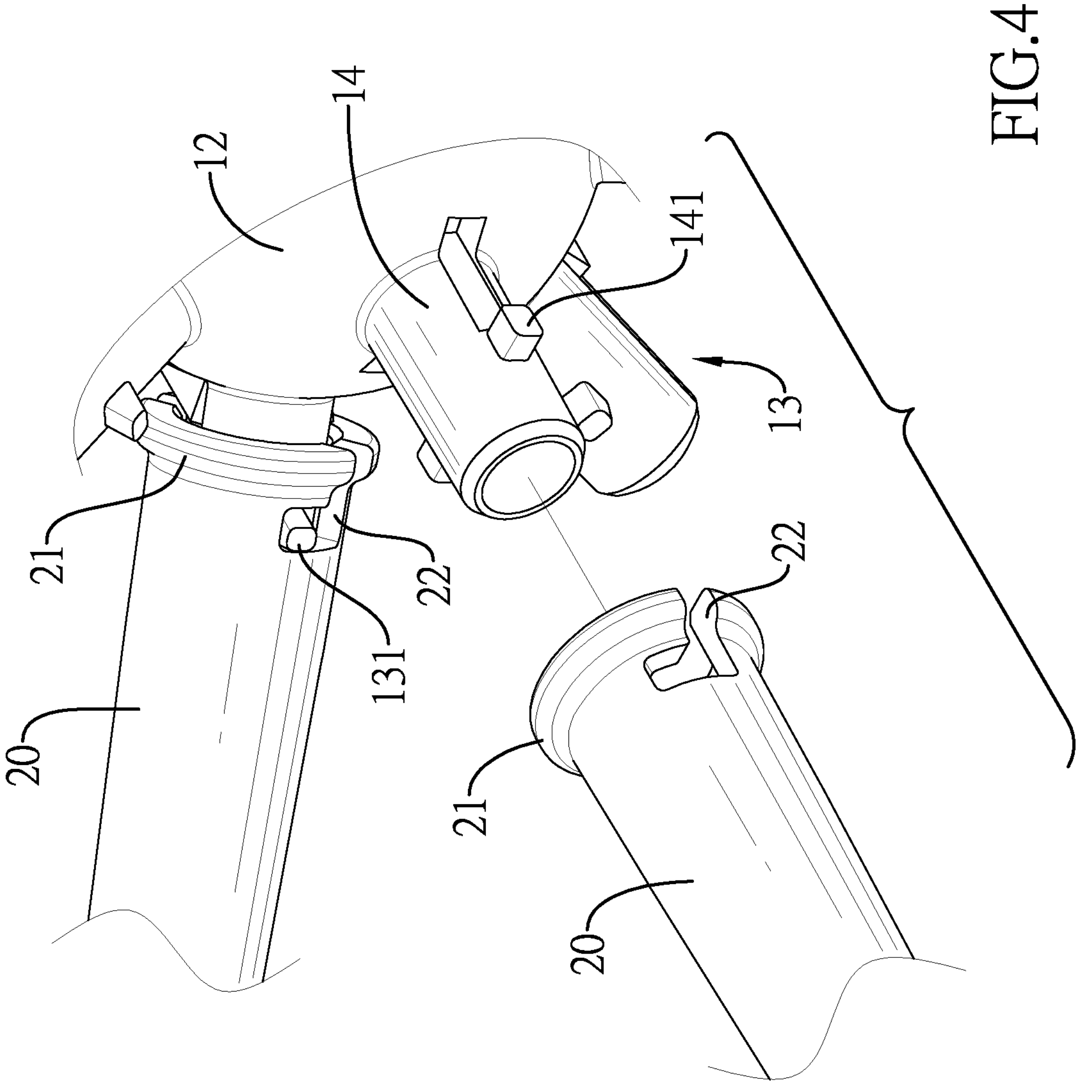
FIG. 4 is a partially enlarged view of FIG. 3.
Figure 8:
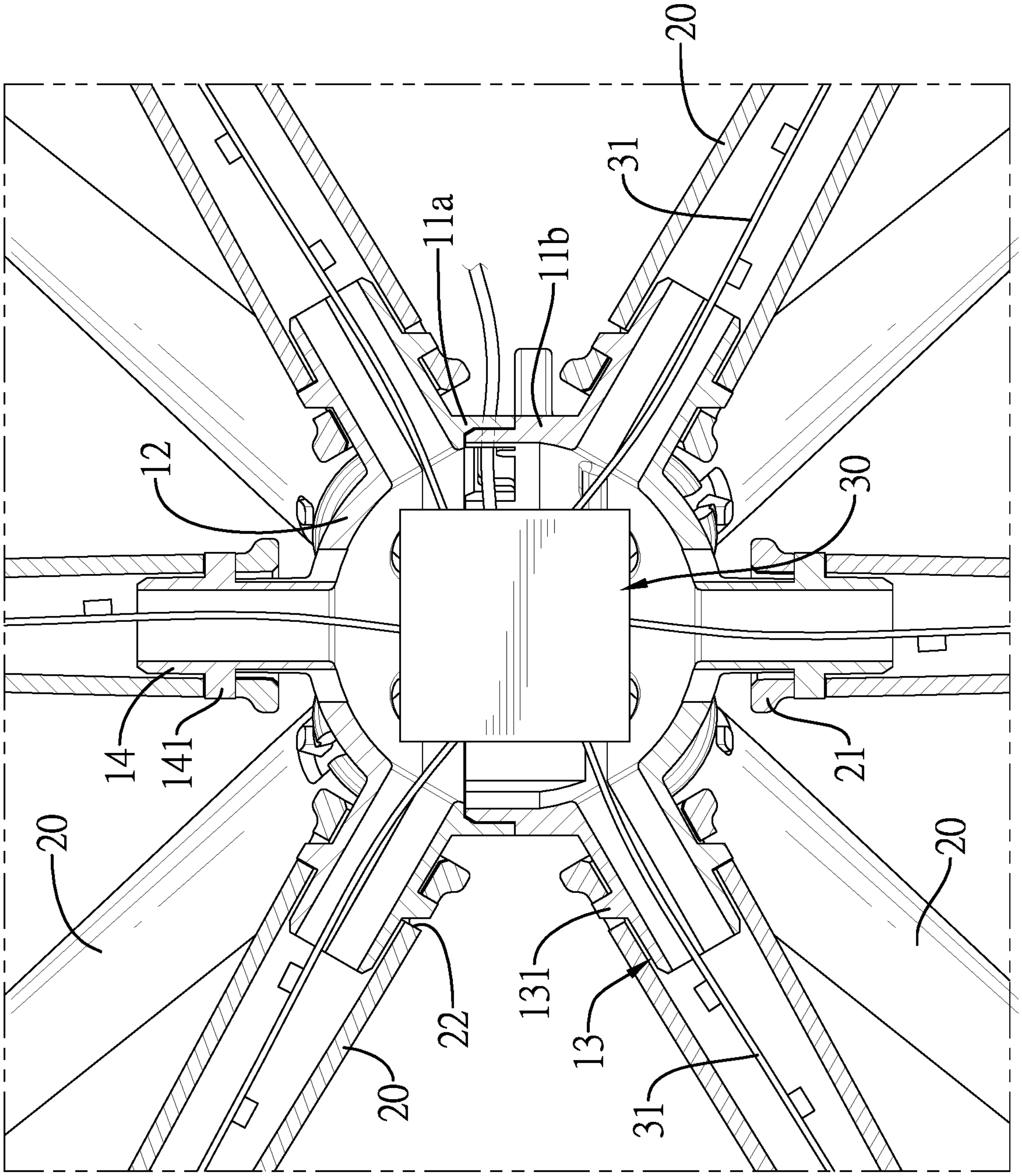
FIG. 8 is a partial sectional view across line 8-8 in FIG. 2.

With reference to FIGS. 1, 2 and 8, a preferred embodiment of a firework lighting device comprises a spherical body 10, multiple conical elements 20 and a light module 30.

With reference to FIGS. 1 and 5 to 7, the spherical body 10 is hollow and comprises two shells 11*a*, 11*b* and two terminal caps 12. The two shells 11*a*, 11*b* are detachably assembled to each other. The two terminal caps 12 respectively correspond to the two shells 11*a*, 11*b*. Each one of the two terminal caps 12 is detachably assembled to the corresponding shell 11*a*, 11*b*. Each corresponding pair of the shell 11*a*, 11*b* and the terminal cap 12 form multiple installing tubes 13, which are spaced apart from each other. Each one of the multiple installing tubes 13 is hollow and has two installing protrusions 131. Each one of the two terminal caps 12 has at least one extending tube 14 having two extending protrusions 141.

With reference to FIGS. 1 to 4, the multiple conical elements 20 are hollow and allow light to pass through. Each one of the multiple conical elements 20 has an installing portion 21, disposed at an end of said conical element 20 and having two installing recesses 22. Each one of the multiple conical elements 20 corresponds to and is assembled to one of the multiple installing tubes 13 or the at least one extending tube 14 through the installing portion 21, and communicates to an interior of the spherical body 10 through the corresponding installing tube 13 or the corresponding extending tube 14. The two installing protrusions 131 of each one of the multiple installing tubes respectively engage with the two installing recesses 22 of the installing portion 21 of the corresponding conical element 20. The two extending protrusions 141 of the at least one extending tube 14 respectively engage with the two installing recesses 22 of the installing portion 21 of the corresponding conical element 20.

With reference to FIG. 8, the light module 30 is mounted to the interior of the spherical body 10 and has multiple light strips 31, which respectively extend into the multiple conical elements 20 and emit light in multiple colors. Preferably, each one of the multiple light strips 31 has multiple light-emitting diodes, which emit light. Also, each one of the multiple light-emitting diodes can emit light in different colors, or each of the multiple light-emitting diodes emits light in a color different from colors of light emitted by other light-emitting diodes.

Figure 9:
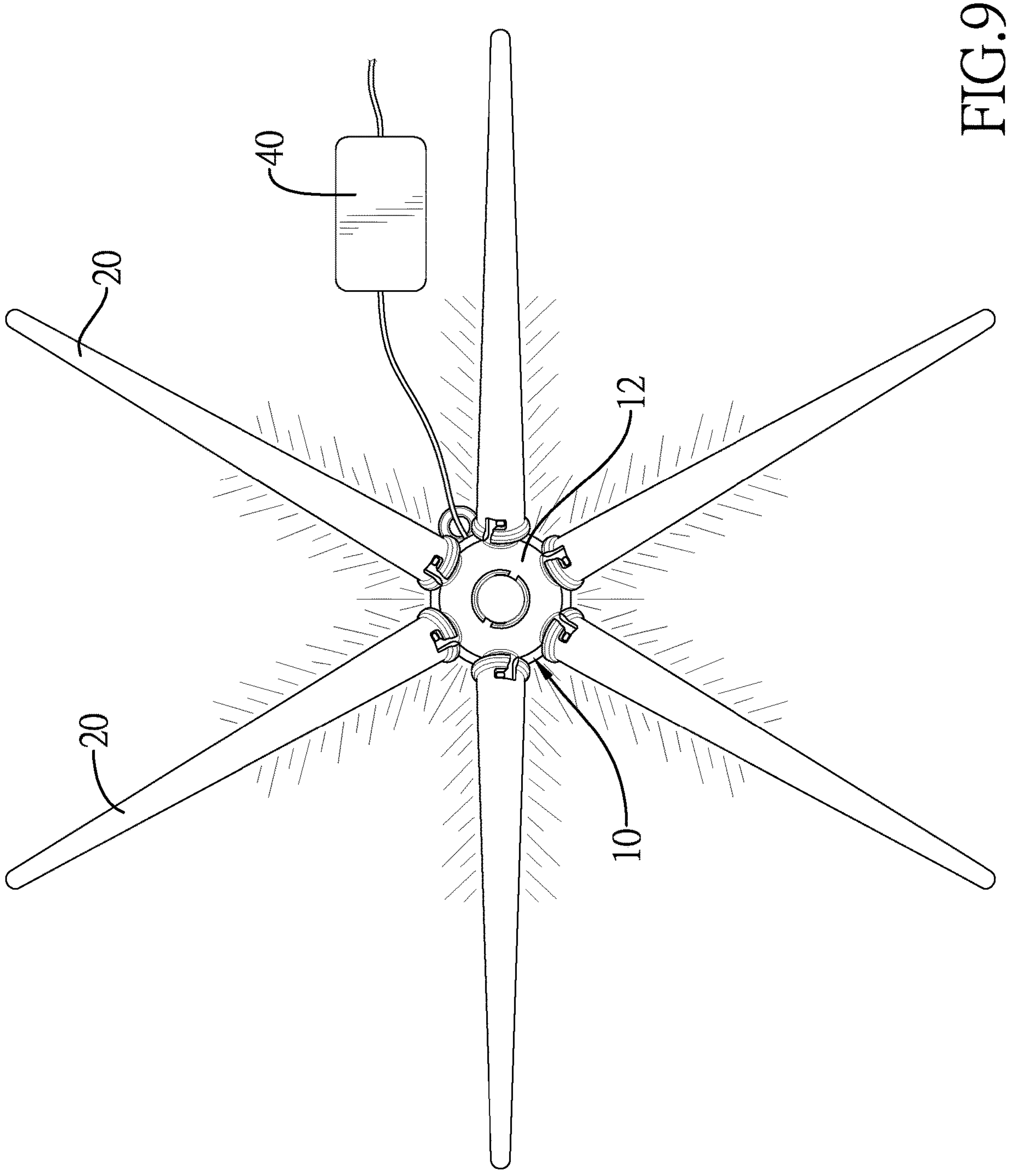
Figure 10:
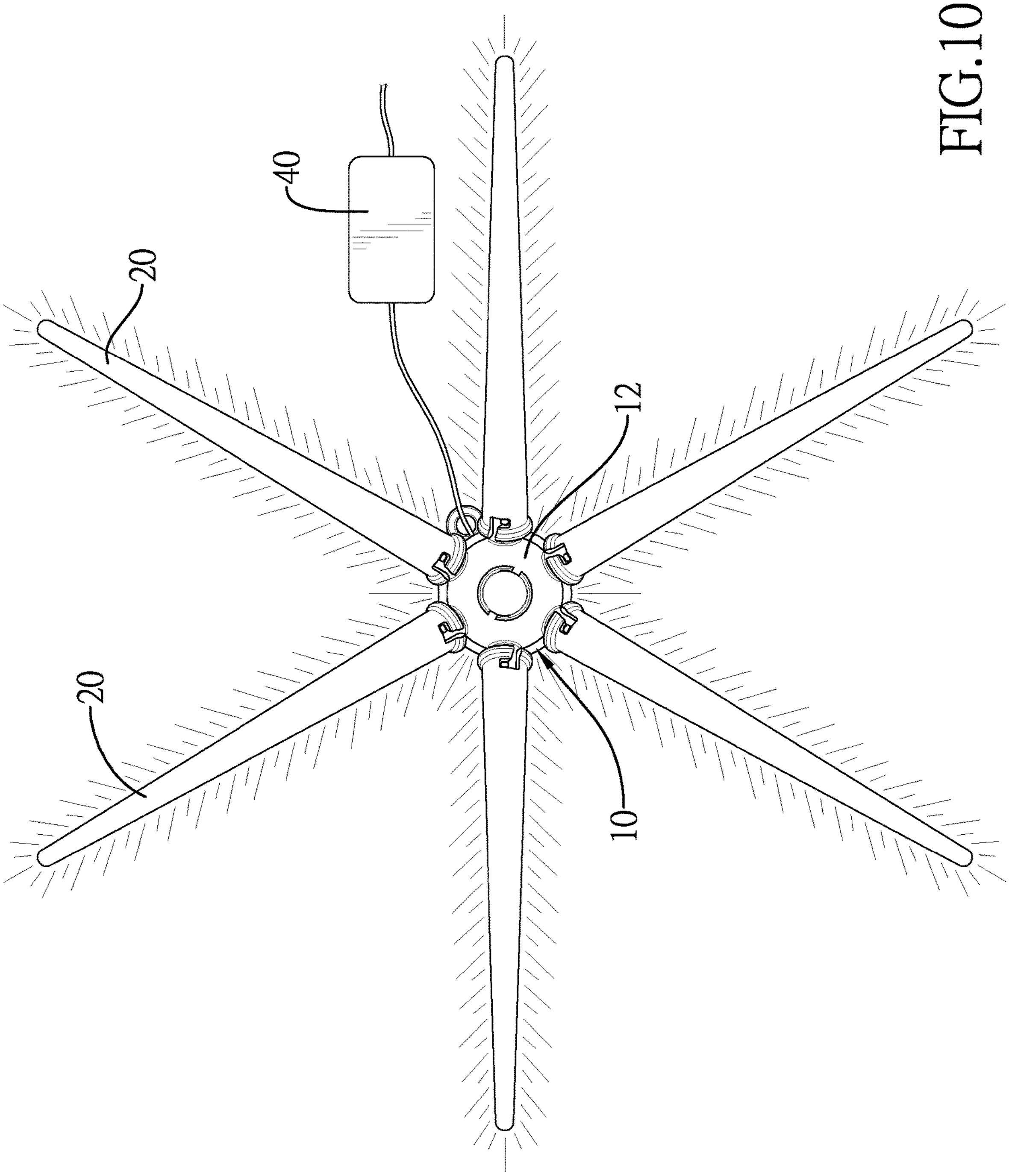
FIG. 10 is an operational view of the firework lighting device in FIG. 1, showing the firework lighting device turned on and light scattering outwardly.

Preferably, with reference to FIGS. 9 and 10, the firework lighting device comprises a controller 40 disposed outside of the spherical body 10 and electrically connected to the light module 30 to control light-emitting frequencies and colors of emitted light of the multiple light strips 31 of the light module 30. Additionally, the spherical body 10 has a connecting opening 15 surrounded by and formed by the two shells 11*a*, 11*b*. The controller 40 is electrically connected to the light module 30 through the connecting opening 15.

With reference to FIGS. 9 and 10, the firework lighting device looks like fireworks due to the spherical body 10 and the multiple conical elements 20, which form a shape that has a sphere at the middle with multiple cones radiating outwardly from the sphere. Also, the multiple light strips 31 of the light module 30 extend into the multiple conical elements 20 and can emit light in various colors. When the firework lighting device is turned on, the multiple light strips 31 of the light module 30 light up the multiple conical elements 20. The multiple light strips 31 inside the multiple conical elements 20 can light up from the spherical body 10 at a center of the firework lighting device outwardly to tips of the multiple conical elements 20 and can flicker intermittently, thereby allowing the firework lighting device to produce a lighting effect resembling firework explosion and spreading stars while flickering, hence increasing decoration capabilities of the firework lighting device.

Furthermore, by the controller 40 controlling the light module 30, the multiple light-emitting diodes of the multiple light strips 31 of the light module 30 emit light in different colors and flicker in different frequencies, allowing the light module 30 to have various modes, so the firework lighting device can produce various lighting effects. The modes of the light module 30 comprise different ways to control the multiple light-emitting diodes, such as always lighting up, flickering, lighting up and turning off alternately one by one, and, as mentioned above, lighting up from the center of the firework lighting device outwardly in sequence before turning off in sequence. Also, each one of the multiple conical elements 20 can be transparent, or can gradually turn transparent from the installing portion 21 toward the tip of said conical element 20, so brightness of the firework lighting device increases outwardly from its center, further matching an image of fireworks.

Besides, multiple firework lighting devices can be connected through the controller 40. So, when turning on the light module 30 of the firework lighting devices, the multiple firework lighting devices work in the same mode of the light module 30 and show the same lighting effect.

In addition, the spherical body 10 is formed by assembling the two shells 11*a*, 11*b* and the two terminal caps 12, and the multiple conical elements are assembled to the multiple installing tubes 13 or the at least one extending tube 14. Therefore, components of the firework lighting device can be produced independently, hence increasing manufacturing convenience of the firework lighting device. Additionally, since the two shells 11*a*, 11*b* and the two terminal caps 12 are detachable, replacing or installing the light module 30, which is inside the spherical body 10, becomes easier, thereby increasing usage convenience of the firework lighting device. Following is detailed description of the firework lighting device's structure.

Figure 5:
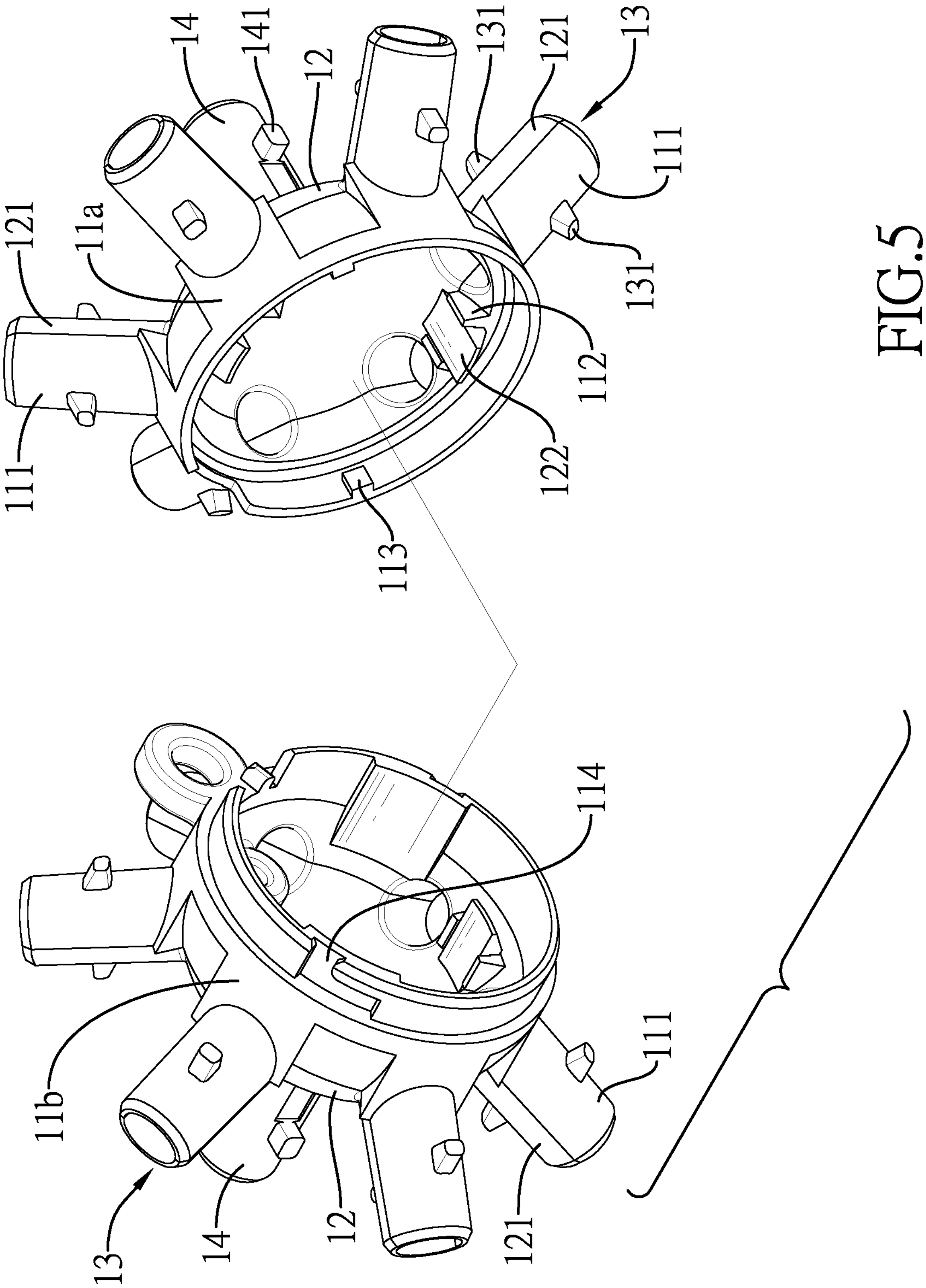
FIG. 5 is an exploded view of the firework lighting device in FIG. 1.
Figure 6:
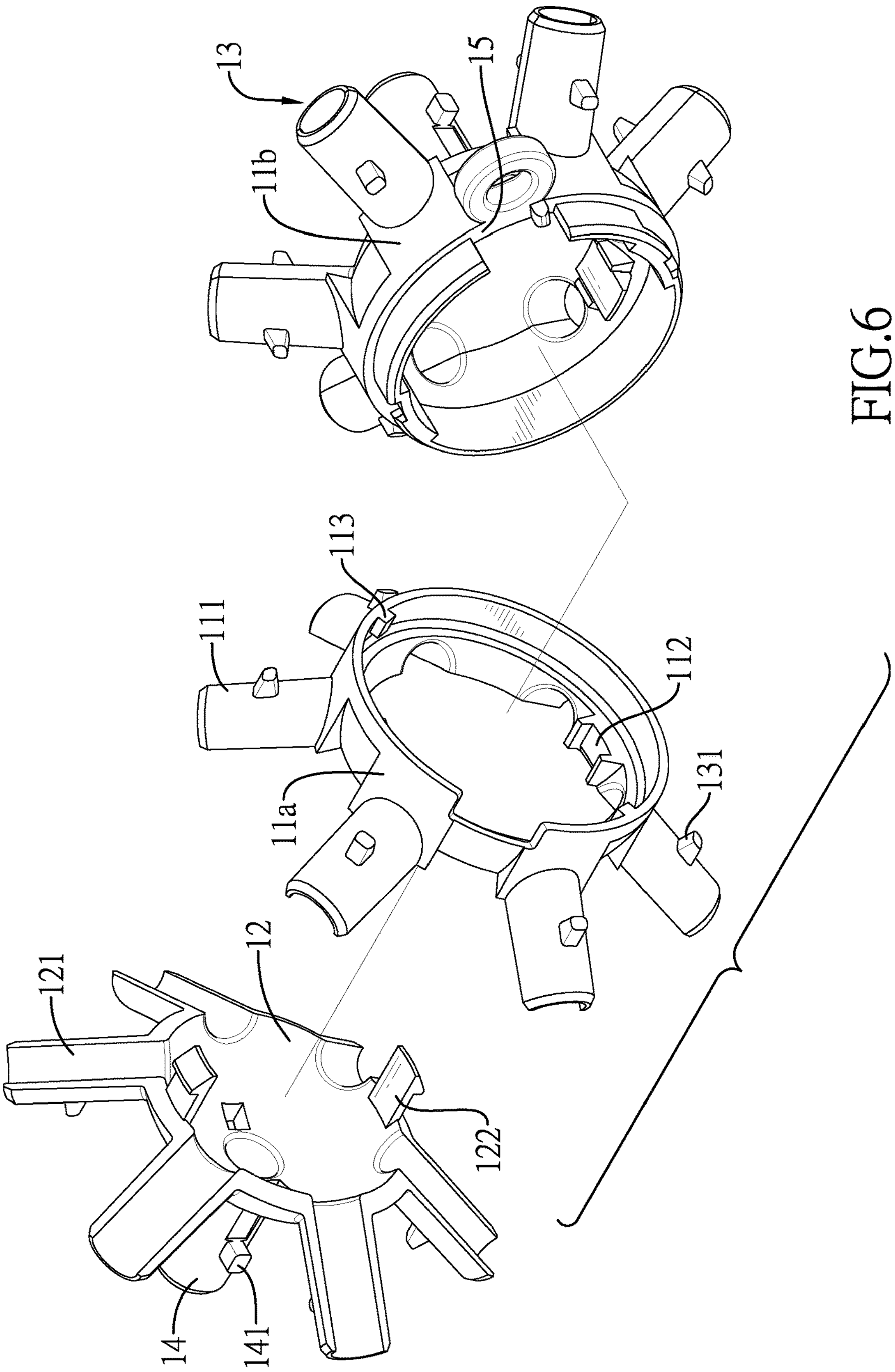
FIG. 6 is another exploded view of the firework lighting device in FIG. 1.
Figure 7:
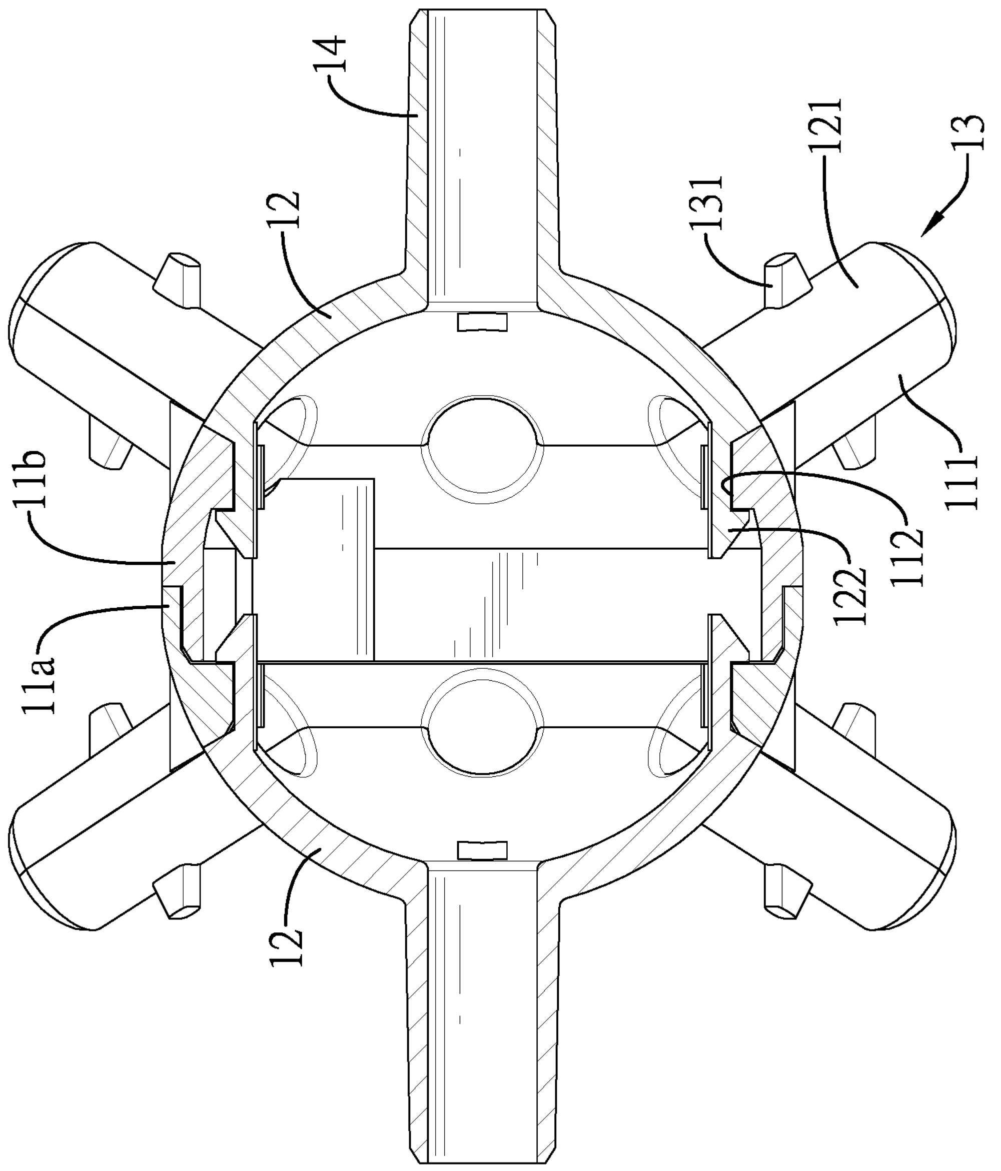
FIG. 7 is a partial sectional view across line 7-7 in FIG. 2.

With reference to FIGS. 5 to 7, each one of the two shells 11*a*, 11*b* has multiple first tubular portions 111. Each one of the two terminal caps 12 has multiple second tubular portions 121. The multiple first tubular portions 111 of each one of the two shells 11*a*, 11*b* respectively are combined with the multiple second tubular portions 121 of the corresponding terminal cap 12 to form the multiple installing tubes 13. The two installing protrusions 131 of each one of the multiple installing tubes 13 are respectively disposed at the first tubular portion 111 and the second tubular portion 121 of said installing tube 13.

With reference to FIGS. 5 to 7, each one of the two shells 11*a*, 11*b* has multiple clamping portions 112 inside said shell 11*a*, 11*b*. Each one of the two terminal caps 12 has multiple clamping hooks 122 protruding from said terminal cap 12, extending into the shell 11*a*, 11*b* corresponding to said terminal cap 12 and engaging with the multiple clamping portions 112 of said shell 11*a*, 11*b* to assemble said terminal cap 12 and said shell 11*a*, 11*b*.

With reference to FIGS. 5 to 7, the two shells 11*a*, 11*b* are respectively defined as a first shell 11*a* and a second shell 11*b*. The first shell 11*a* has multiple assembling chunks 113 inside the first shell 11*a*. The second shell 11*b* has multiple assembling recesses 114 formed on an outer side of the second shell 11*b* and being L-shaped. The second shell 11*b* extends into the first shell 11*a*, such that the multiple assembling chunks 113 of the first shell 11*a* respectively extend into and engage with the multiple assembling recesses 114 of the second shell 11*b* to assemble the first shell 11*a* and the second shell 11*b*.

Because the multiple installing tubes 13 are formed by the multiple first tubular portions 111 of each one of the two shells 11*a*, 11*b* respectively combined with the multiple second tubular portions 121 of the terminal cap 12 corresponding to said shell 11*a*, 11*b*, manufacturing complexity is decreased and convenience of molding the two shells 11*a*, 11*b* is increased. Furthermore, the two terminal caps 12 are identical and can be made via the same-shaped mold, thereby increasing manufacturing convenience and lowering cost of molds.

Additionally, when assembling each one of the two terminal caps 12 to the corresponding shell 11*a*, 11*b*, just apply force on said terminal cap 12, and the multiple clamping hooks 122 of said terminal cap 12 will engage with the multiple clamping portions 112 of said shell 11*a*, 11*b*, facilitating assembling between said terminal cap 12 and said shell 11*a*, 11*b*. Further, by extending the second shell 11*b* into the first shell 11*a* and rotating the two shells 11*a*, 11*b*, the multiple assembling chunks 113 of the first shell 11*a* respectively extend into and engage with the multiple assembling recesses 114 of the second shell 11*b*, so the first shell 11*a* and the second shell 11*b* can be easily assembled together.

To sum up, the firework lighting device has an appearance that looks like fireworks due to the spherical body 10 and the multiple conical elements 20, which form the shape that has the sphere at the middle with multiple cones radiating outwardly from the sphere. When turning on the firework lighting device, the multiple light strips 31 of the light module 30 light up the multiple conical elements 20, so the firework lighting device produces a lighting effect that looks like fireworks, thereby increasing decoration capabilities of the firework lighting device. Also, as the two shells 11*a*, 11*b* and the two terminal caps 12 of the spherical body 10 are detachable, manufacturing convenience of the spherical body 10 is increased.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A firework lighting device comprising:

a spherical body being hollow and comprising
two shells detachably assembled to each other;
two terminal caps respectively corresponding to the two shells; each one of the two terminal caps assembled to the corresponding shell; each corresponding pair of the shell and the terminal cap together forming
multiple installing tubes spaced apart from each other; each one of the multiple installing tubes being hollow and having
two installing protrusions;
each one of the two terminal caps having
at least one extending tube having
two extending protrusions;
multiple conical elements being hollow and allowing light to pass through; each one of the multiple conical elements having
an installing portion disposed at an end of said conical element; each one of the multiple conical elements corresponding to and assembled to one of the multiple installing tubes or the at least one extending tube through the installing portion, and communicating to an interior of the spherical body through the corresponding installing tube or the corresponding extending tube; the installing portion having
two installing recesses; the two installing protrusions of each one of the multiple installing tubes respectively engaging with the two installing recesses of the installing portion of the corresponding conical element; the two extending protrusions of the at least one extending tube respectively engaging with the two installing recesses of the installing portion of the corresponding conical element; and
a light module mounted to the interior of the spherical body and having
multiple light strips respectively extending into the multiple conical elements and emitting light in multiple colors.

2. The firework lighting device as claimed in claim 1, wherein
each one of the two shells has
multiple first tubular portions;
each one of the two terminal caps has
multiple second tubular portions;
the multiple first tubular portions of each one of the two shells respectively are combined with the multiple second tubular portions of the corresponding terminal cap to form the multiple installing tubes; and
the two installing protrusions of each one of the multiple installing tubes are respectively disposed at the first tubular portion and the second tubular portion of said installing tube.

3. The firework lighting device as claimed in claim 2, wherein
each one of the two shells has 2
multiple clamping portions inside said shell;
each one of the two terminal caps has
multiple clamping hooks protruding from said terminal cap, extending into the corresponding shell and engaging with the multiple clamping portions of said shell to assemble said terminal cap and said shell.

4. The firework lighting device as claimed in claim 3, wherein the firework lighting device comprises
a controller disposed outside of the spherical body and electrically connected to the light module to control light-emitting frequencies and colors of emitted light of the multiple light strips of the light module.

5. The firework lighting device as claimed in claim 4, wherein the spherical body has
a connecting opening surrounded by and formed by the two shells;
the controller is electrically connected to the light module through the connecting opening.

6. The firework lighting device as claimed in claim 5, wherein the two shells are respectively defined as a first shell and a second shell;
the first shell has
multiple assembling chunks inside the first shell;
the second shell has
multiple assembling recesses formed on an outer side of the second shell and being L-shaped;
the second shell extends into the first shell, such that the multiple assembling chunks of the first shell respectively engage in the multiple assembling recesses of the second shell to assemble the first shell and the second shell.

7. The firework lighting device as claimed in claim 4, wherein the two shells are respectively defined as a first shell and a second shell;
the first shell has
multiple assembling chunks inside the first shell;
the second shell has
multiple assembling recesses formed on an outer side of the second shell and being L-shaped;
the second shell extends into the first shell, such that the multiple assembling chunks of the first shell respectively engage in the multiple assembling recesses of the second shell to assemble the first shell and the second shell.

8. The firework lighting device as claimed in claim 3, wherein the two shells are respectively defined as a first shell and a second shell;

the first shell has multiple assembling chunks inside the first shell;

the second shell has multiple assembling recesses formed on an outer side of the second shell and being L-shaped;

the second shell extends into the first shell, such that the multiple assembling chunks of the first shell respectively engage in the multiple assembling recesses of the second shell to assemble the first shell and the second shell.

9. The firework lighting device as claimed in claim 2, wherein the firework lighting device comprises a controller disposed outside of the spherical body and electrically connected to the light module to control light-emitting frequencies and colors of emitted light of the multiple light strips of the light module.

10. The firework lighting device as claimed in claim 2, wherein the two shells are respectively defined as a first shell and a second shell;

the first shell has multiple assembling chunks inside the first shell;

the second shell has multiple assembling recesses formed on an outer side of the second shell and being L-shaped;

the second shell extends into the first shell, such that the multiple assembling chunks of the first shell respectively engage in the multiple assembling recesses of the second shell to assemble the first shell and the second shell.

11. The firework lighting device as claimed in claim 9, wherein the two shells are respectively defined as a first shell and a second shell;

the first shell has multiple assembling chunks inside the first shell;

the second shell has multiple assembling recesses formed on an outer side of the second shell and being L-shaped;

the second shell extends into the first shell, such that the multiple assembling chunks of the first shell respectively engage in the multiple assembling recesses of the second shell to assemble the first shell and the second shell.

12. The firework lighting device as claimed in claim 1, wherein each one of the two shells has multiple clamping portions inside said shell;

each one of the two terminal caps has multiple clamping hooks protruding from said terminal cap, extending into the corresponding shell and engaging with the multiple clamping portions of said shell to assemble said terminal cap and said shell.

13. The firework lighting device as claimed in claim 12, wherein the two shells are respectively defined as a first shell and a second shell;

the first shell has multiple assembling chunks inside the first shell;

the second shell has multiple assembling recesses formed on an outer side of the second shell and being L-shaped;

the second shell extends into the first shell, such that the multiple assembling chunks of the first shell respectively engage in the multiple assembling recesses of the second shell to assemble the first shell and the second shell.

14. The firework lighting device as claimed in claim 1, wherein the firework lighting device comprises a controller disposed outside of the spherical body and electrically connected to the light module to control light-emitting frequencies and colors of emitted light of the multiple light strips of the light module.

15. The firework lighting device as claimed in claim 14, wherein the spherical body has a connecting opening surrounded by and formed by the two shells;

the controller is electrically connected to the light module through the connecting opening.

16. The firework lighting device as claimed in claim 15, wherein the two shells are respectively defined as a first shell and a second shell;

the first shell has multiple assembling chunks inside the first shell;

the second shell has multiple assembling recesses formed on an outer side of the second shell and being L-shaped;

the second shell extends into the first shell, such that the multiple assembling chunks of the first shell respectively engage in the multiple assembling recesses of the second shell to assemble the first shell and the second shell.

17. The firework lighting device as claimed in claim 14, wherein the two shells are respectively defined as a first shell and a second shell;

the first shell has multiple assembling chunks inside the first shell;

the second shell has multiple assembling recesses formed on an outer side of the second shell and being L-shaped;

the second shell extends into the first shell, such that the multiple assembling chunks of the first shell respectively engage in the multiple assembling recesses of the second shell to assemble the first shell and the second shell.

18. The firework lighting device as claimed in claim 1, wherein the two shells are respectively defined as a first shell and a second shell;

the first shell has multiple assembling chunks inside the first shell;

the second shell has multiple assembling recesses formed on an outer side of the second shell and being L-shaped;

the second shell extends into the first shell, such that the multiple assembling chunks of the first shell respectively engage in the multiple assembling recesses of the second shell to assemble the first shell and the second shell.

* * * * *